(12) United States Patent
Lu et al.

(10) Patent No.: US 11,401,651 B2
(45) Date of Patent: Aug. 2, 2022

(54) CARBON CLOTH MATERIAL COATED WITH IODINE-DOPED BISMUTHYL CARBONATE, PREPARATION METHOD THEREOF, AND APPLICATION IN OIL-WATER SEPARATION

(71) Applicant: SOOCHOW UNIVERSITY, Suzhou (CN)

(72) Inventors: Jianmei Lu, Suzhou (CN); Dongyun Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 712 days.

(21) Appl. No.: 16/439,845

(22) Filed: Jun. 13, 2019

(65) Prior Publication Data
US 2019/0382949 A1    Dec. 19, 2019

(30) Foreign Application Priority Data
Jun. 14, 2018    (CN) .......................... 201810616283.0

(51) Int. Cl.
| | | |
|---|---|---|
| D06M 11/76 | (2006.01) | |
| B01D 17/02 | (2006.01) | |
| B01D 39/08 | (2006.01) | |
| D06M 10/02 | (2006.01) | |
| D06M 10/08 | (2006.01) | |
| D06M 23/10 | (2006.01) | |

(52) U.S. Cl.
CPC ............. *D06M 11/76* (2013.01); *B01D 17/02* (2013.01); *B01D 39/086* (2013.01); *D06M 10/02* (2013.01); *D06M 10/08* (2013.01); *D06M 23/10* (2013.01)

(58) Field of Classification Search
CPC combination set(s) only.
See application file for complete search history.

(56) References Cited

U.S. PATENT DOCUMENTS

| 2017/0081786 A1* | 3/2017 | Lozano ................... D01F 9/14 |
|---|---|---|
| 2017/0210912 A1* | 7/2017 | Fujita .................... C07C 311/05 |

FOREIGN PATENT DOCUMENTS

| CN | 107198891 | * | 9/2017 | ............. B01D 17/02 |

* cited by examiner

*Primary Examiner* — Lynda Salvatore
(74) *Attorney, Agent, or Firm* — SZDC Law P.C.

(57) ABSTRACT

The present invention discloses a carbon cloth material coated with iodine-doped bismuthyl carbonate, a preparation method thereof, and application in oil-water separation. The preparation method comprises the following steps: immersing preprocessed carbon cloth in iodine-doped bismuthyl carbonate precursor solution, and carrying out hydrothermal reaction to obtain the carbon cloth material coated with iodine-doped bismuthyl carbonate, wherein the iodine-doped bismuthyl carbonate precursor solution comprises bismuth citrate, sodium carbonate, sodium iodide and ethylene glycol. Through a hydrothermal method, the carbon cloth coated with iodine-doped bismuthyl carbonate is synthesized in one step, and the carbon cloth material has a function of emulsion separation. The material has the advantages of simple preparation, abundant raw material, good separation effect and good application prospect on the aspects of industrial sewage treatment and emulsion separation.

5 Claims, 3 Drawing Sheets

CARBON CLOTH MATERIAL COATED WITH IODINE-DOPED BISMUTHYL CARBONATE, PREPARATION METHOD THEREOF, AND APPLICATION IN OIL-WATER SEPARATION

This application claims priority to Chinese Patent Application No.: 201810616283.0, filed Jun. 14, 2018, which is incorporated by reference for all purposes as if fully set forth herein.

FIELD OF THE INVENTION

The present invention belongs to the technical field of functional materials, and particularly relates to a carbon cloth material coated with iodine-doped bismuthyl carbonate, its preparation method and its application as oil-water separation material.

TECHNICAL BACKGROUND

Water and oil are valuable resources for people to survive. However, a large amount of oil is discharged into water to form an oil-water emulsion, which not only causes pollution of water resources but also wastes valuable oil resources. In recent years, the application of carbon cloth is growing rapidly. Carbon cloth has excellent chemical stability, corrosion resistance, sealing property, high lubrication and non-stickiness, electrical insulation and good anti-aging endurance, but it cannot be applied to the actual oil-water emulsion separation due to its wettability. Therefore, it is necessary to modify the carbon cloth suitably to meet the requirements for separating the oil-water emulsion.

SUMMARY OF THE INVENTION

The object of the present invention is to provide a preparation method of a carbon material coated with bismuthyl carbonate, which comprises hydrothermally method to grow a large amount of nano-size bismuthyl carbonate on the surface of the carbon cloth to prepare a multifunctional composite material, which can effectively separate the oil-water emulsion. The product has good reusability and good repeatability, and it can be industrially produced to achieve the purpose of controlling water pollution.

In order to achieve the above object, the technical solution of the present invention is described as follows:

A preparation method of a carbon cloth material coated with iodine-doped bismuthyl carbonate, comprising the following steps: immersing a pretreated carbon cloth in an iodine-doped bismuthyl carbonate precursor solution, and carrying out hydrothermal reaction to obtain the carbon cloth material coated with iodine-doped bismuthyl carbonate; the iodine-doped bismuthyl carbonate precursor solution includes bismuth citrate, sodium carbonate, sodium iodide, and ethylene glycol.

The present invention also discloses a method for separating oil and water, comprising the following steps:

(1) immersing a pretreated carbon cloth in an iodine-doped bismuthyl carbonate precursor solution, and carrying out hydrothermal reaction to obtain the carbon cloth material coated with iodine-doped bismuthyl carbonate; the iodine-doped bismuthyl carbonate precursor solution includes bismuth citrate, sodium carbonate, sodium iodide, and ethylene glycol;

(2) introducing the oil-water emulsion to be separated into the carbon cloth material coated with iodine-doped bismuthyl carbonate to complete the separation of oil and water.

In the above technical solution, first, dissolving sodium carbonate powder in water at room temperature, and adding ethylene glycol, and after stirring, adding bismuth citrate powder, and stirring the mixture until the solution is colorless and transparent, and then adding sodium iodine powder to obtain the iodine-doped bismuthyl carbonate precursor solution.

Preferably, the hydrothermal reaction is carried out at 180° C. for 24 h. At this temperature, bismuth citrate decomposes and reacts with sodium carbonate to form bismuthyl carbonate. The bismuthyl carbonate nanosheet grows on the surface of the carbon cloth.

In the above technical solution, the carbon cloth is ultrasonically washed with acetone, ethanol and deionized water respectively, and then immersed in concentrated nitric acid to obtain the pretreated carbon cloth. The surface of the carbon cloth activated by nitric acid produces groups such as carboxyl group, which enhances the reactivity of the carbon cloth and makes it easier to grow crystals.

In the above technical solution, the hydrothermal reaction is carried out twice, and the conditions of the two hydrothermal reactions are the same, so as to make the bismuthyl carbonate grow more completely, and to let the obtained product have better separation performance.

In the present invention, the preparation method of a carbon cloth material coated with iodine-doped bismuthyl carbonate includes these steps:

(1) preparing a certain amount of iodine-doped bismuthyl carbonate precursor solution by using bismuth citrate as a precursor;

(2) immersing the pretreated carbon cloth in the solution, and the hydrothermal reaction is carried out in the reaction vessel, and the reaction is repeated twice, to obtain the carbon cloth material coated with iodine-doped bismuthyl carbonate to use as oil-water separation material.

The present invention also discloses a carbon cloth material coated with iodine-doped bismuthyl carbonate obtained by above described preparation method; also with the application of the iodine-doped bismuthyl carbonate precursor solution or the carbon cloth material coated with iodine-doped bismuthyl carbonate in the separation of water and oil.

In the present invention, bismuthyl carbonate is applied in the field of oil-water emulsion separation as a semiconductor photocatalyst for the first time, and can be used for degrading various organic pollutants with excellent performance, and in the hydrothermal preparation of bismuthyl carbonate crystal, the formation process and structure are different under different conditions.

Through a hydrothermal method, the carbon cloth coated with iodine-doped bismuthyl carbonate is synthesized in one step, and the carbon cloth material has a function of emulsion separation. The material has the advantages of simple preparation, abundant raw material, good separation effect and good application prospect on the aspects of industrial sewage treatment and emulsion separation.

DETAILED DESCRIPTION OF THE INVENTION

Embodiment 1

The preparation of the iodine-doped bismuthyl carbonate precursor solution is as follows:

Dissolve 1.325 g of sodium carbonate powder in 100 ml of water at room temperature, add 25 ml of ethylene glycol, and stir for 20 minutes; add 5 g of bismuth citrate to the above solution, continuously stirring until the solution is colorless and transparent. Finally, add 3.5 g of sodium iodide, stir for 20 minutes to obtain an iodine-doped bismuthyl carbonate precursor solution.

The carbon cloth is ultrasonically washed with acetone, ethanol and deionized water, and then immersed in concentrated nitric acid for 6 hours to obtain a pretreated carbon cloth. The SEM image is shown in FIG. 1.

The specific steps of the hydrothermal method are as follows:

The pretreated carbon cloth is immersed in an iodine-doped bismuthyl carbonate precursor solution, and then the solution and carbon cloth are transferred to a 150 ml stainless steel autoclave, and reacted at 180° C. for 24 hours. After the reaction, the carbon cloth is washed twice with ethanol and deionized water, and then the carbon cloth is placed in the autoclave for a second reaction, and reacted at 180° C. for 24 hours. After the reaction, the carbon cloth is washed twice with ethanol and deionized water to obtain a carbon cloth material coated with iodine-doped bismuthyl carbonate. The SEM image is shown in FIG. 1.

Figure 1:
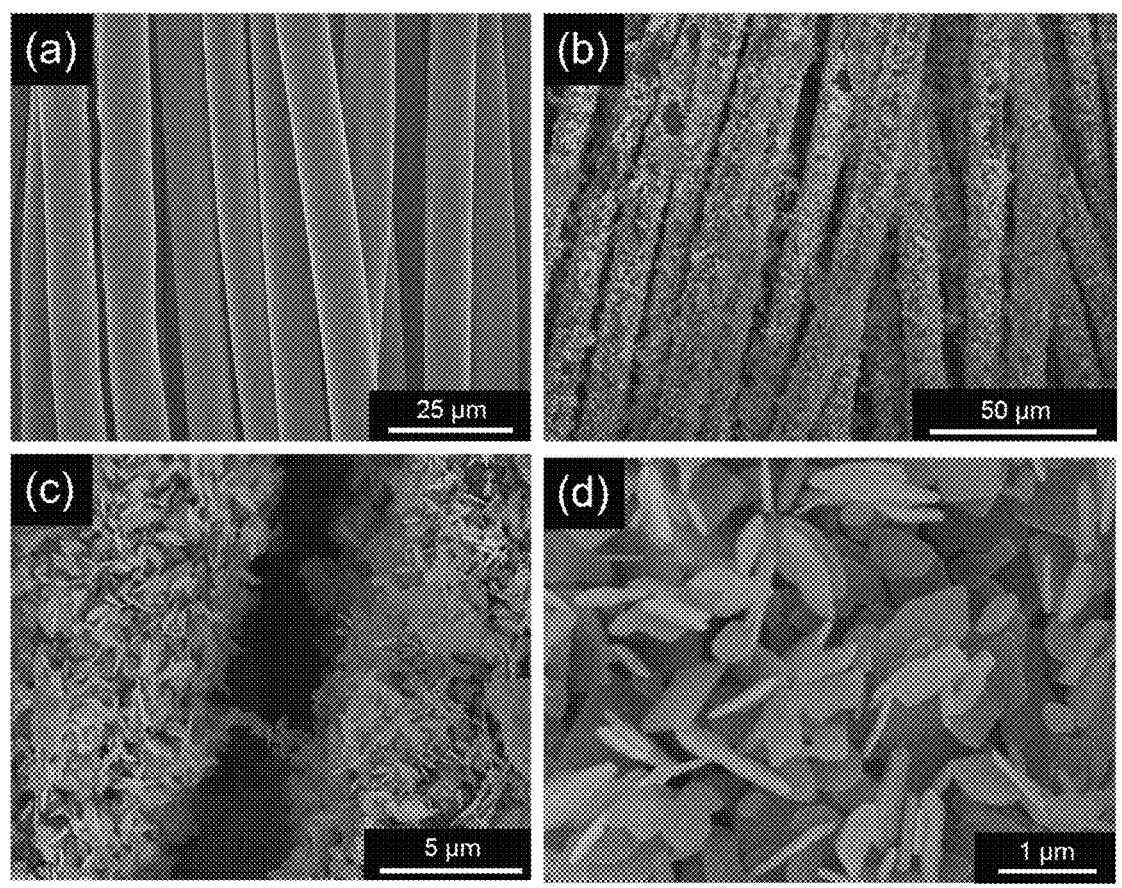
FIG. 1 is a scanning electron micrograph of carbon cloth before and after modification.

FIG. 1 is a SEM image of a carbon cloth before and after modification. (a) is a SEM image of carbon cloth before modification, (b), (c), and (d) are SEM images of products at different resolutions. It can be seen from the figure that a large amount of iodine-doped bismuthyl carbonate nanosheet uniformly grows on the surface.

Embodiment 2

Wettability test of carbon cloth coated with iodine-doped bismuthyl carbonate

Figure 2:
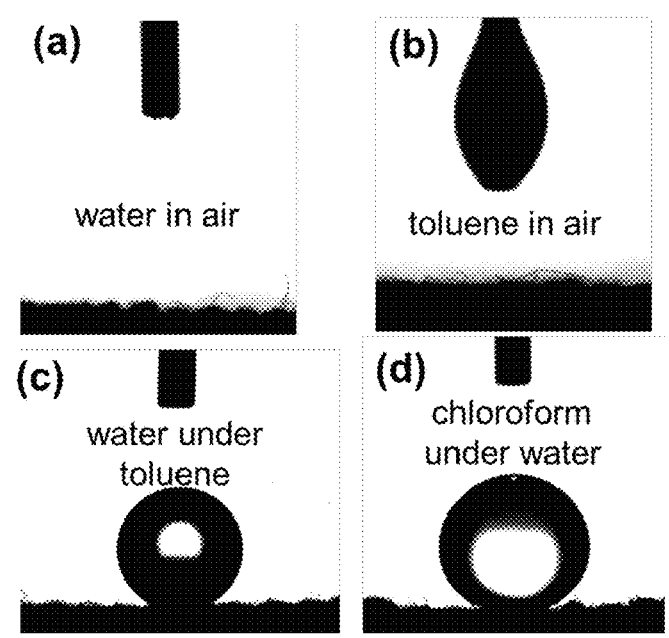
FIG. 2 is a wettability test of the modified carbon cloth.

FIG. 2 is a wettability test. The carbon cloth coated with iodine-doped bismuthyl carbonate exhibits superhydrophilicity in the air. When the water droplets and the oil droplets contact the surface of the carbon cloth, they spread rapidly and the contact angle is 0°. When the carbon cloth is immersed in water, chloroform aggregates into a spherical shape on the surface of the carbon cloth, and the contact angle is 154°; when the carbon is placed in toluene, the water droplets also aggregates into a spherical shape on the surface, and the contact angle is 153°. The results show that the modified carbon cloth meets the wettability requirements for oil/water emulsion separation. (a) is the contact angle of water in air, (b) is the contact angle of toluene in air, and (c) is the contact angle of toluene under water, and (d) is the contact angle of chloroform under water.

Embodiment 3

The emulsion separation test, the specific steps are as follows:

10 ml of toluene is added to 90 ml of water, and then 50 mg of sodium dodecyl sulfate is added and stirred for 2 hours, after which the prepared emulsion is used for the emulsion separation test.

Figure 3:
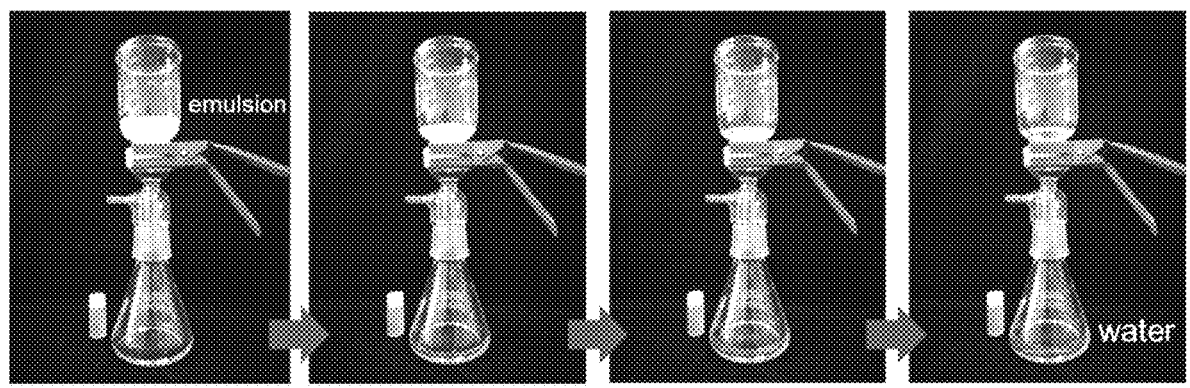
FIG. 3 is a separation test of the oil/water emulsion of the modified carbon cloth.

A carbon cloth coated with iodine-doped bismuthyl carbonate is placed in a glass filter, and then 100 ml oil/water emulsion is poured in. FIG. 3 is a step of separating the oil/water emulsion. As can be seen from the figure, after pouring the milky white oil/water emulsion into the glass filter, the purified water flows into the glass filter flask, indicating that it has good emulsion separation effectiveness.

Embodiment 4

Separation efficiency and flux test, the specific steps are as follows:

Separation efficiency and flux. The separation efficiency of the oil/water emulsion is calculated using the following equation:

$$R\ (\%) = (1 - C_p/C_o) \times 100\%$$

Where R (%) is the oil displacement coefficient, and $C_p$ and $C_o$ are the oil concentrations of the collected water and oil/water emulsion, respectively. Purified water is analyzed by UV-visible spectrophotometry. The flux of the emulsion is determined by calculating the amount of filtration per unit time according to the following equation:

$$\text{Flux} = V/At$$

Where A ($cm^2$) is the effective filtration surface of the membrane, V ($L/m^2 h$) is the volume of the filtrate, and t (h) is the separation time. Pour the same amount of oil/water emulsion in each test.

Figure 4:
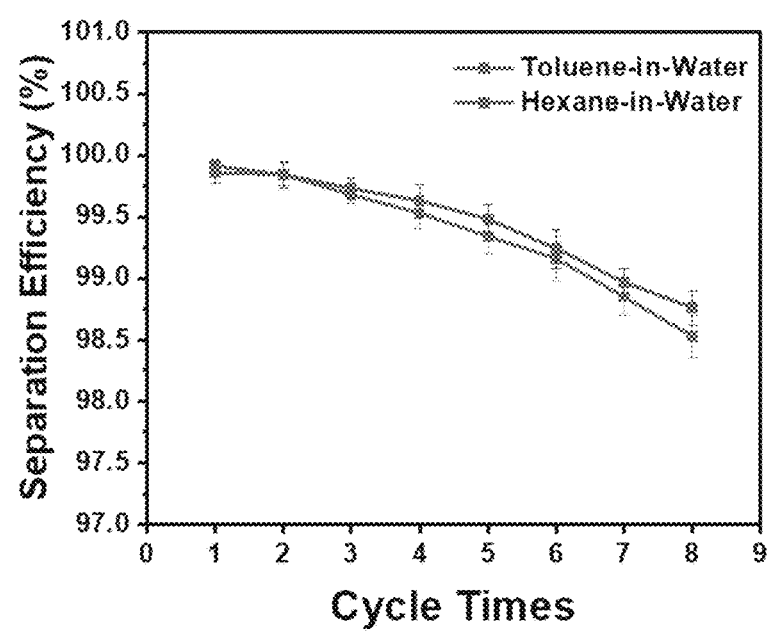
FIG. 4 is a cyclic efficiency test of the modified carbon cloth.
Figure 5:
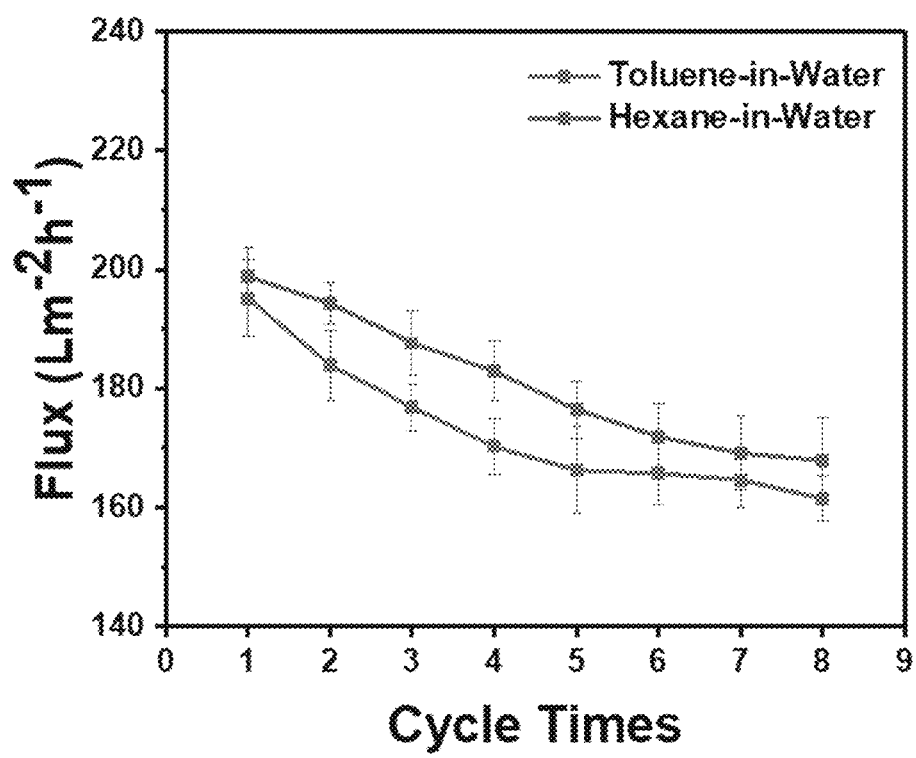
FIG. 5 is a cyclic flux test of the modified carbon cloth.

FIGS. 4 and 5 show the cyclic separation effect and flux of the material on the toluene-in water and hexane-in-water emulsions. It can be found that the material still maintains a good separation effect after the cycle test.

Through the above analysis, a carbon cloth material coated with iodine-doped bismuthyl carbonate is synthesized by a hydrothermal method in one step in the invention, and has the function of separating the emulsion. The material has the advantages of simple preparation, easy availability of raw materials, good separation effect and good cycle ability, and has good application prospects in industrial sewage treatment and emulsion separation.

What is claimed is:

1. A method for separating oil and water, comprising the following steps:
   (1) immersing a pretreated carbon cloth in an iodine-doped bismuthyl carbonate precursor solution, and carrying out hydrothermal reaction to obtain the carbon cloth material coated with iodine-doped bismuthyl carbonate; the iodine-doped bismuthyl carbonate precursor solution includes bismuth citrate, sodium carbonate, sodium iodide, and ethylene glycol;
   (2) introducing the oil-water emulsion to be separated into the carbon cloth material coated with iodine-doped bismuthyl carbonate to complete the separation of oil and water.

2. The method according to claim 1, wherein dissolving sodium carbonate powder in water at room temperature, and adding ethylene glycol, and after stirring, adding bismuth citrate powder, and stirring the mixture until the solution is colorless and transparent, and then adding sodium iodine powder to obtain the iodine-doped bismuthyl carbonate precursor solution.

3. The method according to claim 1, wherein said hydrothermal reaction is carried out at 180° C. for 24 h.

4. The method according to claim 1, wherein the carbon cloth is ultrasonically washed with acetone, ethanol and deionized water respectively, and then immersed in concentrated nitric acid to obtain the pretreated carbon cloth.

5. The method according to claim 1, wherein said hydrothermal reaction is carried out twice, and the conditions of the two hydrothermal reactions are the same.

\* \* \* \* \*